: US007672244B2

United States Patent
Sweeney

(10) Patent No.: US 7,672,244 B2
(45) Date of Patent: Mar. 2, 2010

(54) CONVERTING A NETWORK DEVICE FROM DATA RATE TRAFFIC MANAGEMENT TO PACKET RATE

(75) Inventor: Adam Sweeney, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 11/095,477

(22) Filed: Mar. 30, 2005

(65) Prior Publication Data

US 2006/0221835 A1 Oct. 5, 2006

(51) Int. Cl.
*G01R 31/08* (2006.01)
*H04J 3/16* (2006.01)
*G06F 15/16* (2006.01)

(52) U.S. Cl. .............. 370/241; 370/229; 370/465; 709/232; 709/233

(58) Field of Classification Search ......... 370/229–230, 370/230.1, 241, 465, 466–467, 474, 476, 370/469–472, 538, 540, 542, 543–544, 235; 709/232–233
See application file for complete search history.

(56) References Cited

U.S. PATENT DOCUMENTS

| | | | | |
|---|---|---|---|---|
| 6,327,275 | B1 * | 12/2001 | Gardner et al. | 370/535 |
| 6,463,063 | B1 * | 10/2002 | Bianchini et al. | 370/395.53 |
| 6,594,268 | B1 * | 7/2003 | Aukia et al. | 370/400 |
| 6,958,978 | B1 * | 10/2005 | Ireland et al. | 370/252 |
| 7,088,678 | B1 * | 8/2006 | Freed et al. | 370/230 |
| 7,133,406 | B2 * | 11/2006 | Konuma | 370/395.42 |
| 7,139,271 | B1 * | 11/2006 | Parruck et al. | 370/392 |
| 7,295,516 | B1 * | 11/2007 | Ye | 370/232 |
| 2003/0067876 | A1 * | 4/2003 | Sharma et al. | 370/232 |
| 2004/0068577 | A1 | 4/2004 | Ruutu | |
| 2005/0117513 | A1 * | 6/2005 | Park et al. | 370/230 |
| 2005/0147103 | A1 * | 7/2005 | Yang et al. | 370/395.4 |
| 2005/0195840 | A1 * | 9/2005 | Krapp et al. | 370/401 |
| 2006/0018316 | A1 * | 1/2006 | Ehara et al. | 370/389 |

OTHER PUBLICATIONS

Cisco Systems, Inc., "Comparing Traffic Policing and Traffic Shaping for Bandwidth Limiting", Copyright © 1992-2003, 8 pages.
Cisco Systems, Inc., "Policing and Shaping Overview", Copyright © 1991-2005, 18 pages.
Cisco Systems, Inc. "Traffic Management (Chapter 4)", Copyright © 1992-2005, 9 pages.

\* cited by examiner

*Primary Examiner*—Kwang B Yao
*Assistant Examiner*—Candal Elpenord
(74) *Attorney, Agent, or Firm*—Trellis IP Law Group, PC

(57) ABSTRACT

A network device that manages the flow rate of a stream of packets traveling within a network is converted from managing based on data rate to managing based on packet rate. In one embodiment, an interface receives from the device an actual length of a packet and provides to the device an effective length for the packet. A multiplexer generates the effective length by selecting the actual length during data rate mode and selecting a virtual length during packet rate mode. Various embodiments work with network devices that use various traffic management techniques. Such techniques include, but are not limited to: virtual time algorithms for determining excess packets; policing techniques that drop excess packets; and shaping techniques that buffer excess packets for possible later transmission.

13 Claims, 4 Drawing Sheets

CONVERTING A NETWORK DEVICE FROM DATA RATE TRAFFIC MANAGEMENT TO PACKET RATE

BACKGROUND OF THE INVENTION

Substantial changes have occurred in the communication and computing industries over approximately the past decade. These changes have been driven, in part, by the increasing dominance of networking in general, and of the Internet in particular. In the past many computers and other digital devices were standalone, that is, they operated without communicating with other devices. Today however, being interconnected with other devices, even those physically separated by vast distances, substantially enhances the capabilities and usefulness of many digital devices.

Packet networks are often used to convey information among digital devices. In a packet network, the information conveyed is divided into a number of packets, where each packet is small enough in size for the packet network to convey the packet. Each packet contains a header with information about the packet, including for example, the address of the device to which the packet is to be sent.

A stream of packets flows from a particular device to another particular device, and typically a corresponding stream flows between the same two devices in the opposite direction. As the packets are forwarded along their route by various network devices, they are often intermixed with packets from other streams.

When all is working well, networking provides substantial benefits over computers and other digital devices operating alone. However, networks are vulnerable both to accidental malfunctions and to malicious attacks. Networks can be seriously disrupted, for example, when they receive more information than they can successfully convey. Some network devices have large capacities to convey information, for example, they may be able to receive and forward several million packets per second, where each packet contains several thousand bytes of data. Nevertheless, every device connected to, or part of, a network has a limited capacity to properly process network traffic.

No digital device can function properly if the device must handle too many packets, or too many bytes, within a period of time, where "too many" is determined by the specifications and capabilities of each particular device. Thus, managing network traffic is an important aspect of ensuring the reliability and security of networks.

Some network devices manage traffic by limiting the rate at which packets within a particular stream of network traffic are handled by the device, regardless of the number of bytes within that stream. Other network devices manage traffic by limiting the rate at which bytes within a particular stream are handled, regardless of the number of packets within that steam.

SUMMARY OF EMBODIMENTS OF THE INVENTION

Various embodiments of the invention provide apparatuses and methods for converting a network device that manages the flow rate of a stream of packets traveling within a network from managing the stream based on the data rate of the stream to managing the stream based on the packet rate of the stream.

Other embodiments of the invention provide methods and apparatuses for a network device that manages the flow rate of a stream of packets either based on a data rate or on a packet rate of the stream.

One embodiment of the invention includes: an interface adapted to receive from the network device an actual length of a packet received within the stream and to provide the network device with an effective length for the packet received; a control circuit that indicates whether the network device is in a packet rate mode or a data rate mode; and a multiplexer that generates the effective length by selecting the actual length when the mode is data rate and selecting a virtual length when the mode is packet rate.

In some embodiments of the invention, the value of the virtual length is predetermined. In other embodiments, the control circuit receives and holds the virtual length value.

Various embodiments of the invention are adapted to work with various network devices that use various traffic management techniques. These techniques include, but are not limited to: determining which packets are excess based on a virtual time algorithm; dropping excess packets in a policing type network device; buffering excess packets for possible later transmission in a shaping type network device; or dropping some excess packets and buffering some excess packets.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 1:
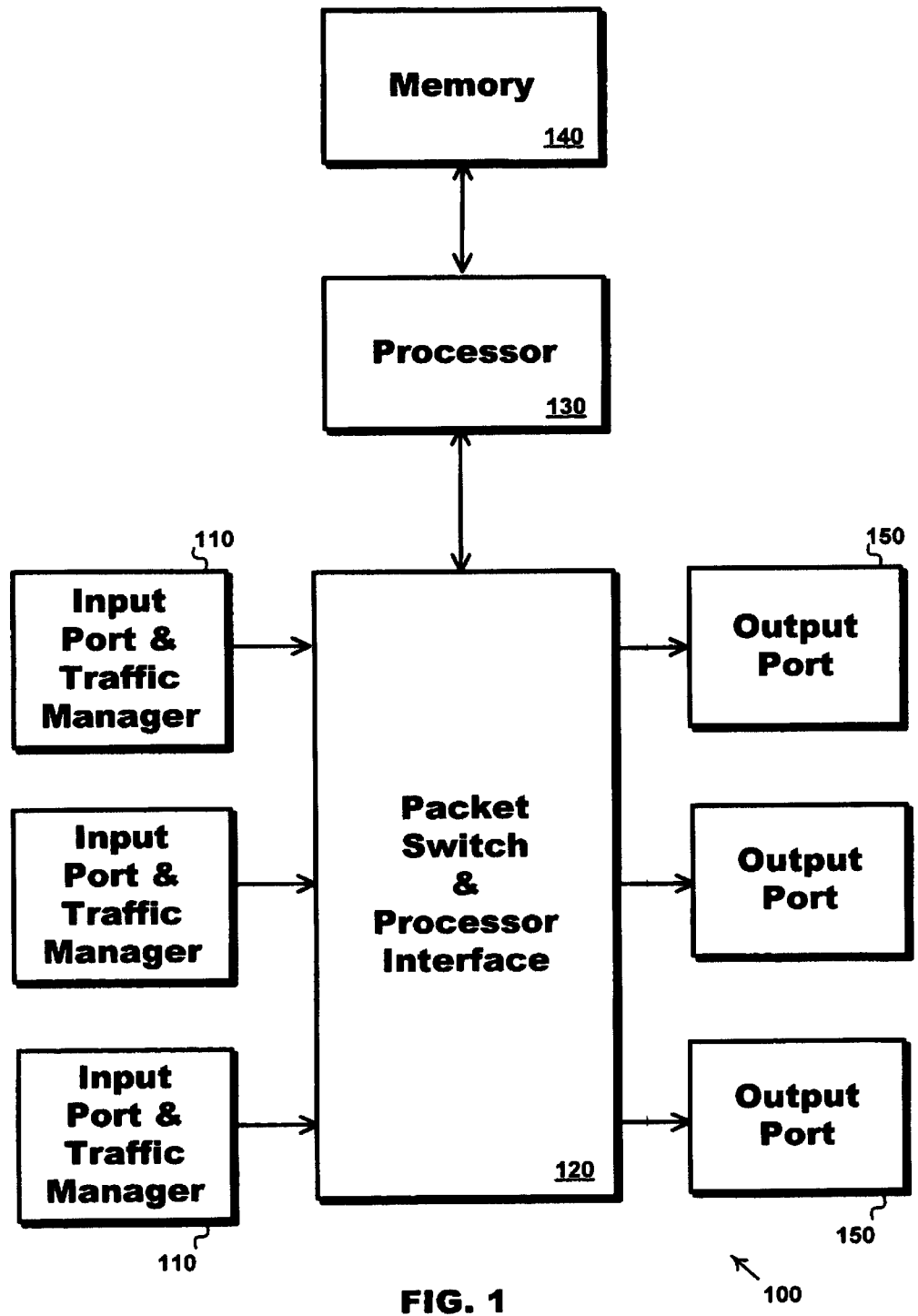
FIG. 1 shows the components and the data flow among the components, within a network device, according to an embodiment of the invention.

FIG. 1 is a block and data-flow diagram of a network device 100, according to an embodiment of the invention. Each arrow in FIG. 1 indicates a coupling between the corresponding components within device 100. Each arrowhead indicates the direction in which data primarily flows over that coupling.

Network device 100 includes a number of input ports and traffic managers 110, a packet switch and processor interface 120, a processor 130, a memory 140, and a number of output ports 150. Each port/traffic manager 110 is coupled to packet switch and processor interface 120. Switch/interface 120 is coupled to each output port 150, as well as to processor 130. Processor 130 is also coupled to memory 140.

Processor 130 may be, but is not limited to: a central processing unit; a microprocessor; an embedded processor; or a special purpose processor. Memory 140 may be, but is not limited to: random access memory (RAM); static RAM; dynamic RAM; other volatile memory devices; read only memory (ROM); programmable ROM; flash memory; electrically programmable ROM (EPROM); erasable electrically programmable ROM (EEPROM); other non-volatile memory devices; or any combination thereof.

Network device 100 is designed to operate as part of a data communication network, in particular, device 100 forwards packets of network data traffic. Device 100 receives packets on the input port components within the ports/managers 110. These packets are conveyed to the input port from an electronic device via a network link. This electronic device is external to device 100, but is within the same network as device 100. Device 100 re-transmits or forwards these packets on one or more of its output ports 150, depending on the number and location within the network of the destination device or devices for the packets.

Typically, but not necessarily, one input port of device 100 is coupled to an output port of a particular electronic device, and one output port of device 100 is coupled to an input port of that particular electronic device. Such electronic devices may include, but are not limited to, hosts, personal computers (PCs), personal digital assistants (PDAs), servers, or other network devices.

Each port/manager 110 includes a traffic manager that manages the flow rate of the packets received on that input port. Each port/manager 110 generally forwards the packets received to switch and interface 120. Packet switch and processor interface 120 forwards the packets on to one or more output port 150.

However, some packets may be dropped or delayed by the traffic manager component within each port/manager 110. Packets are dropped or delayed when the flow rate of the packets received on the corresponding input port exceeds the criteria held within the traffic manager. That is, the traffic manager component within each port/manager 110 limits the bandwidth of the stream of packets that flows out of that port/manager 110.

In some modes of operation of the traffic manager, stream bandwidth is limited based on the packet rate of the stream, that is, the rate at which packets arrive from the stream regardless of how much data each packet includes. Packet rate is typically, but not necessarily, measured as packets per second.

In other modes of operation of the traffic manager, stream bandwidth is limited based on the data rate of the stream, that is, the rate at which data arrives from the stream, regardless of the number of packets into which that data is divided. Data rate is typically, but not necessarily, measured as bytes per second.

In some embodiments of the invention, switch/interface 120 sends header information from each packet to processor 130. Processor 130 uses this header information to determine on which output port(s) 150 that particular packet is to be retransmitted. Processor 130 makes this determination under the control of device management software or firmware that is held within memory 140. Processor sends back to switch/interface 120 an indication of the selected port(s).

In such embodiments, the factor limiting the rate at which network device 100 can convey packets is typically the time required for processor 130 to process the header information in order to determine the output port(s) for each packet. Thus, it is preferable (but not always necessary) for the traffic manager component within each port/manager 110 within such embodiments to operate in a mode that restricts the flow of packets from the port/manager 110 based on the packet rate of the flow, rather than the data rate of the flow. Restricting the packet rate advantageously ensures proper processing of the packets that fall within the rate restrictions. Unless some other element of the network ensures that the packet rate is low enough that processor 130 is not overwhelmed, restricting the packet rate is necessary to ensure the correct operation of device 100.

In other embodiments of the invention, one or more of output ports 150 is replaced with a combination traffic manager and output port. Such embodiments are advantageous when that output port is linked to another device in the network that can handle packets only at a limited rate.

In some applications of the invention, packet rate restrictions are imposed for considerations other than keeping network traffic within the bounds set by the capacity of the network devices or of the other electronic devices in the network. For example, factors including marketing, pricing, security, quality of service, or a combination thereof may warrant restricting the packet flow rate of a stream of network traffic.

In other embodiments or applications of the invention, it is advantageous to restrict the data flow rate of a stream of network traffic. Such situations include, but are not limited to the following: i) a network device 100 that is used to convey packets of sufficient data size that the component that limits the capacity of the device is packet switch/processor interface 120, and not processor 130; ii) networks where the factor limiting the network capacity is the maximum data rate over one or more of the network links between network devices 100 not the capacity of the network devices 100; or iii) situations where the factors mentioned above other than capacity are important considerations but where data rate and not packet rate is the appropriate measure of network traffic.

Figure 2:
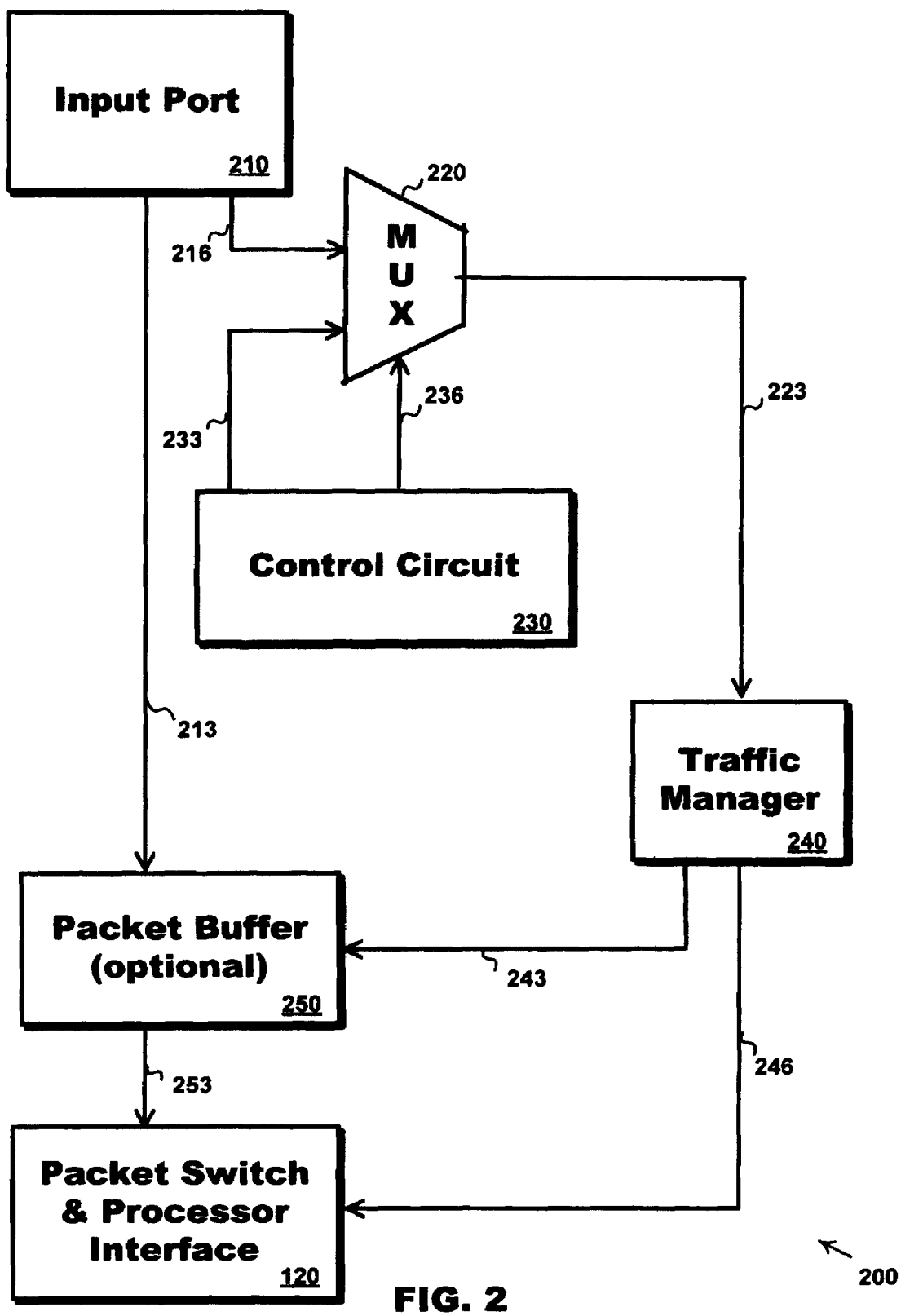
FIG. 2 shows the components, and the data flow among the components, of another network device according to another embodiment of the invention.

FIG. 2 is a block and data flow diagram of a portion 200, according to an embodiment of the invention, of a network device. This network device may be, but need not be, network device 100. Each arrow in FIG. 2 indicates a coupling between the corresponding components within device portion 200. Each arrowhead indicates the direction in which data primarily flows over that coupling.

Device portion 200 includes an input port 210, a multiplexer 220, a control circuit 230, a traffic manager 240, an optional packet buffer 250, and the packet switch and processor interface 120 as described with respect to FIG. 1. Packet buffer 250 is used in embodiments of the invention in which traffic manager 240 is a shaper-type manager in which excess packets are buffered and may be transmitted at a later time if bandwidth becomes available, that is, if the packet flow rate declines.

Packets flow over coupling 213 from input port 210, to packet buffer 250, and from there over coupling 253 to switch/interface 120. In embodiments of the invention in which traffic manager 240 is a policer-type manager in which excess packets are dropped, packet buffer 250 is not used and packets flow directly from input port 210 to switch/interface 120.

For each packet received on input port 210, the port determines the length of that packet. Packet lengths are typically, but not necessarily, represented as a byte count. This actual packet length flows over coupling 216 to a data input of multiplexer 220. A virtual packet length flows over coupling 233 from control circuit 230 to another data input of multiplexer 220.

The control signal that multiplexer 220 uses to select between the actual packet length and the virtual packet length flows to the multiplexer from control circuit 230 over coupling 236. The selected length, known as the effective packet length, flows to traffic manager 240 over coupling 223. Packet manager 240 determines whether each packet received on input port 210 is within the criteria for an allowable flow rate or is an excess packet.

Control circuit 230 holds an indication of the current operational state of traffic manager 240. If the current operational state indicates a packet rate mode, then the virtual packet length is used for each packet regardless of its actual length. On the other hand, if the current operational state indicates a data rate mode, then the actual packet length is used for each packet.

In some embodiments of the invention, the virtual packet length is predetermined and can not be altered. Alternatively, the virtual packet length may be dynamic, that is, held in a register that can be altered by the administrator of the network, or by the management software of the network device. Alternatively, the virtual packet length may be may be held in a non-volatile memory that can be altered only when the network device is rebooted or reconfigured.

If packet manager 240 is a traffic policer and the packet is excess, then a control signal flows over coupling 246 instructing switch/interface 120 to drop the packet. If packet manager 240 is a traffic policer and the packet is within the allowable criteria, then a control signal flows over coupling 243 instructing packet buffer 250 to forward the packet in a normal manner, or to otherwise process the packet in a normal manner.

If packet manager 240 is a traffic shaper and the packet is excess, then a control signal flows over coupling 243 instructing packet buffer 250 to buffer the packet for possible later transmission. If packet manager 240 is a traffic shaper and the packet is within the allowable criteria, then a control signal flows over coupling 243 instructing packet buffer 250 to immediately convey the packet onto switch/interface 120.

Device portion 200 is advantageous in that only minor additions are required to network device 100 to enable it to manage traffic based on either a data flow rate or a packet flow rate, assuming that the additions are measured relative to a network device that only manages the data flow rate of network traffic. Specifically, these minor additions include only multiplexer 220, control circuit 230, and data paths 233 and 236.

Device portion 200 is also advantageous when it is desired to convert an existing design for a particular network device 100 that manages network traffic based only on the data rate of the traffic into a device that has both data rate and packet rate management capabilities. The detailed design, debugging, and operational verification within a potentially complex network of such an existing design can be largely carried over to the slightly modified design in which these few components are added.

Figure 3A:
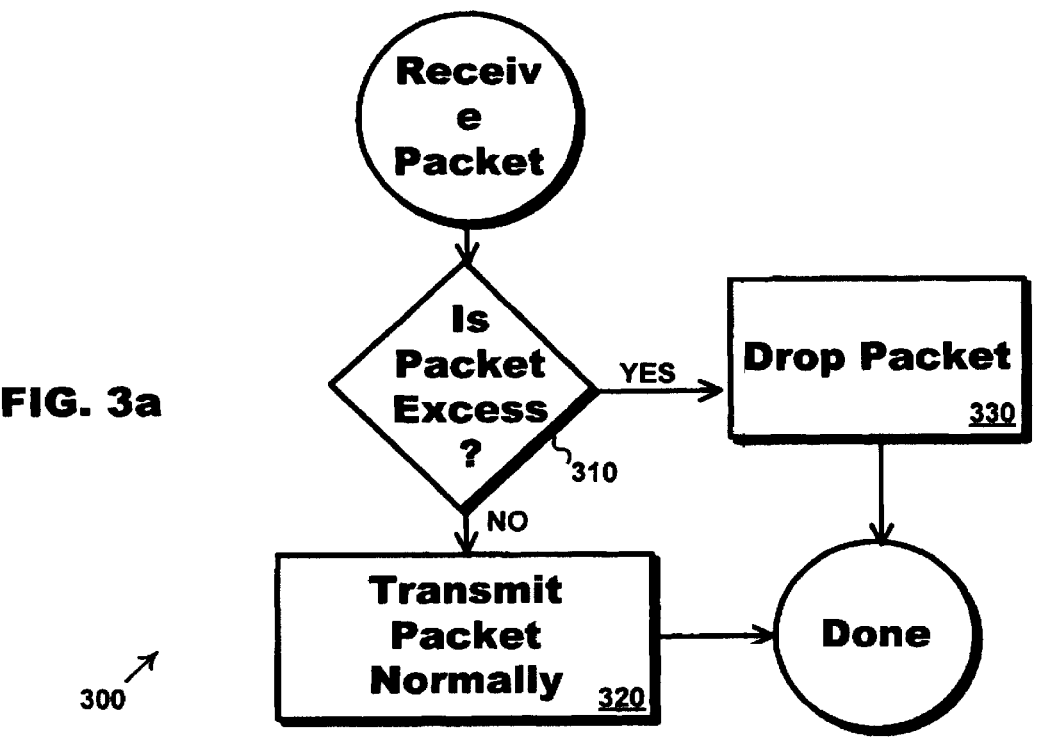
FIG. 3a shows the activities that occur when a packet is received by a network device that polices network traffic by dropping excess packets.

FIG. 3a is a flow chart of a process 300, in which the traffic manager used is a traffic policer. Some embodiments of the invention are adapted to work with policer-type traffic managers. Some embodiments of the invention include such traffic managers.

Process 300 occurs whenever an input port receives a packet. Process 300 starts with activity 310 and ends with the completion of either activity 320 or activity 330. In activity 310, whether or not the packet received is excess is determined. If excess, then in activity 330 the packet is dropped. If not, then in activity 320 the packet is transmitted normally.

Process 300 may be, but need not be, performed within device portion 200. If it is, then when a packet is received by input port 210, traffic manager 240 performs activity 310 to determine whether or not the packet is excess. Interface/switch 120 performs either activity 330 to drop the packet or activity 320 to transmit the packet normally.

Figure 3B:
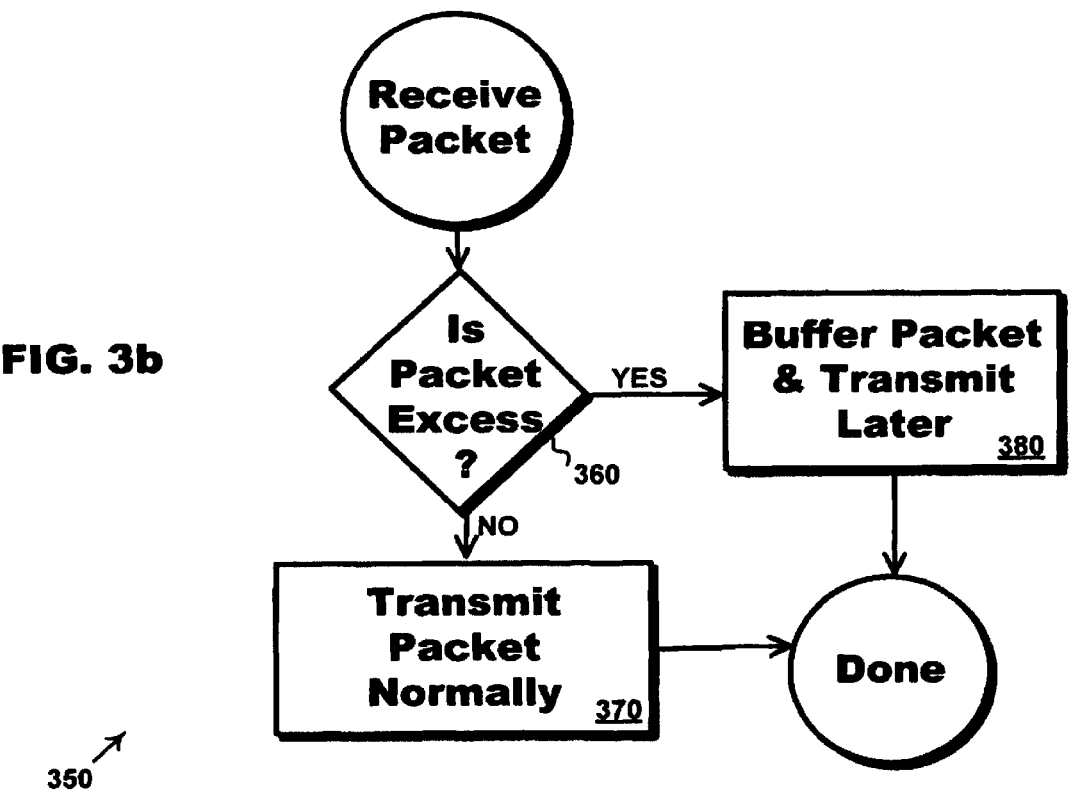
FIG. 3b shows the activities that occur when a packet is received by a network device that shapes network traffic by buffering excess packets for possible transmission at a later time.

FIG. 3b is a flow chart of a process 350, in which the traffic manager used is a traffic shaper. Some embodiments of the invention are adapted to work with shaper-type traffic managers. Some embodiments of the invention include such traffic managers.

Process 350 occurs whenever an input port receives a packet. Process 350 starts with activity 360 and ends with the completion of either activity 370 or activity 380. In activity 360, whether or not the packet received is excess is determined. If excess, then in activity 380 the packet is buffered and, possibly, transmitted later. If not, then in activity 370 the packet is transmitted normally.

Process 350 may be, but need not be, performed within device portion 200. If it is, then when a packet is received by input port 210, traffic manager 240 performs activity 360 to determine whether or not the packet is excess. Packet buffer 250 performs either activity 380 to buffer the packet for possible later transmission or activity 370 to transmit the packet normally.

Figure 4:
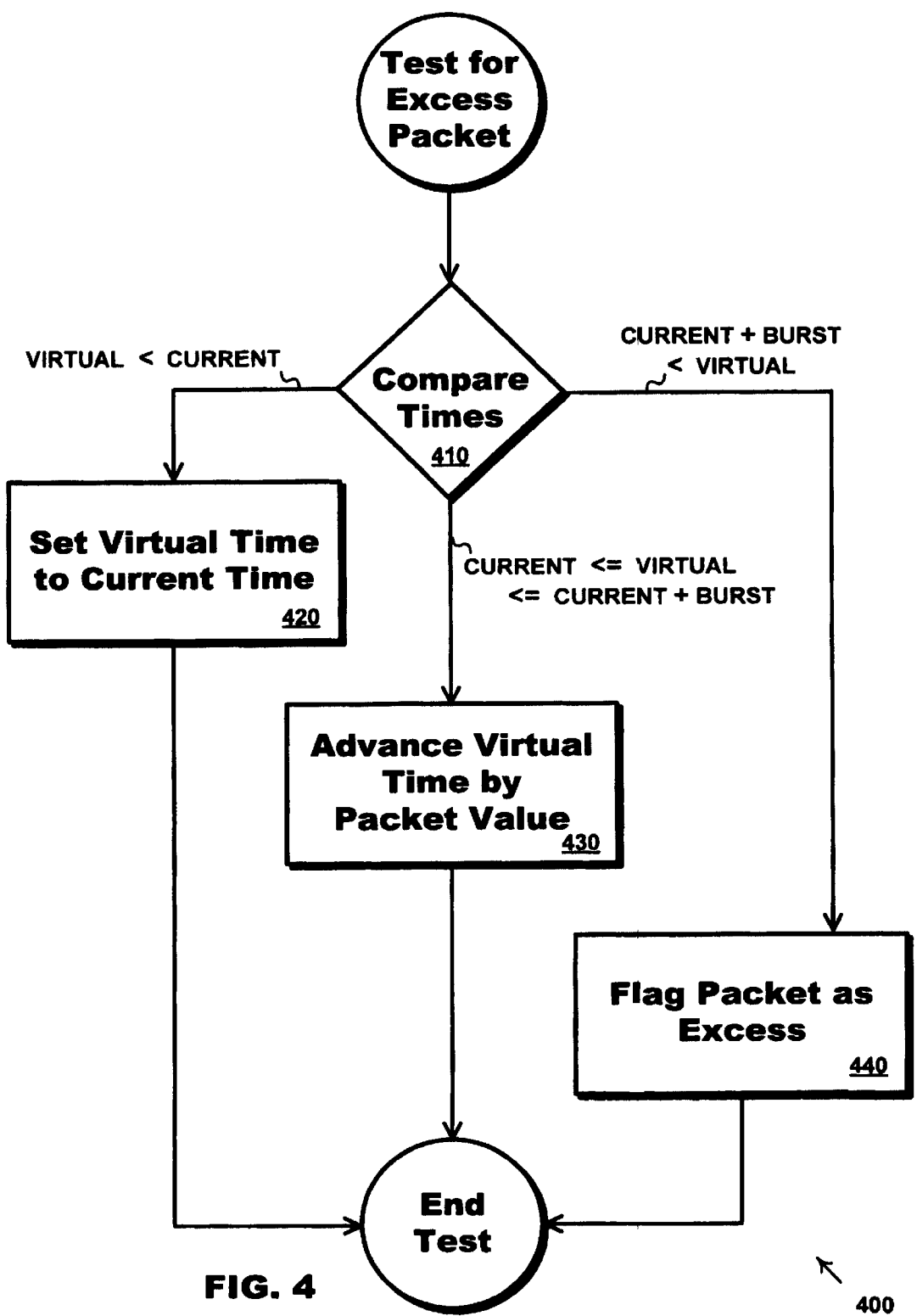
FIG. 4 shows the activities that occur when a packet is received by a network device that uses a virtual time algorithm to determine which packets are excess.

FIG. 4 is a flow chart of a process 400, in which the traffic manager uses a virtual time algorithm to determine which packets are excess. Some embodiments of the invention are adapted to work with such traffic managers. Some embodiments of the invention include such traffic managers. Process 400 starts with activity 410 and ends with the completion of any of activities 420, 430 or 440.

A virtual time traffic management algorithm maintains two variables: the current time and the virtual time. The current time increments at a steady rate, for example, it may be implemented as a free running counter. The virtual time is set by the virtual time algorithm, for example, it may be held in a register.

The behavior of the virtual time algorithm is altered by setting two parameters: the packet multiplier and the burst time. These two parameters may be hard wired or predetermined, in which case there are fixed criteria for testing each packet to determine whether or not the packet is excess. Alternatively, one or both of the parameters may be dynamic, that is, held in a register that can be altered by the administrator of the network, or by the management software of the network device. Alternatively or additionally, one or both of the parameters may be held in a non-volatile memory that can be altered only when the network device is rebooted or reconfigured.

In step 410, a value is computed for the current time plus the burst time, and the virtual time is compared against this value and against the current time. There are three possible outcomes of this comparison: i) the virtual time is less than the current time; ii) the virtual time is greater than or equal to the current time but is less than or equal to the current time plus the burst time; or iii) the virtual time is greater than the current time plus the burst time.

Outcome (i) indicates that the recent flow rate has been below the steady rate allowed by the criteria; thus, the packet is not excess. When activity 410 results in outcome (i), then activity 420 occurs. In activity 420, the virtual time is set to the current time, which prevents a device from sending a stream of packets with a very large burst of activity after a period of inactivity.

Outcome (ii) indicates that the recent flow rate is above the steady rate allowed by the criteria but within the limit set for a short burst of high rate activity; thus, the packet is not excess. When activity 410 results in outcome (ii), then activity 430 occurs. In activity 430, the virtual time is advanced by the packet value, which equals the packet multiplier times the effective packet length. As a monetary analogy, advancing the virtual time is how the packet stream "pays for" transmitting the packet, and the burst time parameter is the credit limit up to which the packet stream may borrow from future bandwidth allocation.

Outcome (iii) indicates that the recent flow rate is above the limit set for a short burst of high rate activity; thus, the packet is excess. When activity 410 results in outcome (iii), then activity 440 occurs. In activity 440, the packet is flagged as excess and the virtual time is not changed. In this situation, the virtual time represents the value that the current time must reach before another packet can be received that will not be flagged as excess.

Although the invention has been described with respect to specific embodiments thereof, these embodiments are merely illustrative, and not restrictive of the invention. For example, devices 100 and device portion 200, as shown in FIGS. 1 and 2, are only illustrative. The invention may be embodied in network systems and devices with more or fewer components, other types of components, or other interconnection schemes. Further, processes 300, 350 and 400, as shown in FIGS. 3a, 3b, and 4 are only illustrative examples. The invention may be embodied in network processes with more or fewer activities, other types of activities, and other control flows or concurrencies among the activities.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. An apparatus adapted to convert a network device from managing a data rate of an input stream of packets to managing a packet rate of the input stream, the apparatus comprising: an interface adapted to receive from the network device an actual length of each of the packets, and adapted to provide to the network device an effective length for the packet received; a control circuit configured to hold an indication of whether the network device is in a packet rate mode or in a data rate mode, wherein the data rate is determined without respect to a number of packets of data in the input stream, and wherein the packet rate is determined with respect to the number of packets of data in the input stream; a multiplexer configured to generate the effective length by selecting either the actual length or a virtual length, wherein the actual length is represented by a byte count, wherein the virtual length is predetermined and provided by the control circuit, wherein the multiplexer selects the actual length as the effective length when the data rate mode is indicated, wherein the multiplexer selects the virtual length as the effective length when the packet rate mode is indicated, and wherein, in the packet rate mode, the virtual length is used regardless of the actual length; and a traffic manager coupled to the multiplexer to use the effective length to limit a rate of processing the input stream within the apparatus, wherein the traffic manager is further configured to determine which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received.

2. The apparatus of claim 1, where the control circuit is further configured to receive a value, hold the value, and provide the value as the virtual length.

3. An a network device that manages a flow rate of an input stream of packets based on either a packet rate or a data rate of the input stream, the network device comprising: a control circuit configured to hold an indication of whether the network device is in a packet rate mode or in a data rate mode, wherein the data rate is determined without respect to a number of packets of data in the input stream, and wherein the packet rate is determined with respect to the number of packets of data in the input stream; a multiplexer configured to generate an effective length by selecting either an actual length or a virtual length, wherein the actual length is represented by a byte count, wherein the virtual length is predetermined and provided by the control circuit, wherein the multiplexer selects the actual length as the effective length when the data rate mode is indicated, wherein the multiplexer selects the virtual length as the effective length when the packet rate mode is indicated, and wherein, in the packet rate mode, the virtual length is used regardless of the actual length; and a traffic manager configured to receive the effective length and to manage, based thereon, the flow rate of the input stream, wherein the traffic manager is further configured to determine which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received.

4. The network device of claim 3, where the control circuit is further configured to receive a value, hold the value, and provide the value as the virtual length.

5. The network device of claim 3, where the traffic manager is selected from a traffic manager configured to police the input stream and to drop excess packets, a traffic manager configured to shape the stream and to buffer excess packets for possible later transmission, or a traffic manager configured to drop some excess packets and to buffer some excess packets for possible later transmission.

6. An apparatus adapted for converting a network device from managing a data rate of an input stream of packets to managing a packet rate of the input stream, the apparatus comprising: means for receiving from the network device an actual length of each of the packets, and adapted for providing to the network device an effective length for the packet received; means for holding an indication of whether the network device is in a packet rate mode or in a data rate mode, wherein the data rate is determined without respect to a number of packets of data in the input stream, and wherein the packet rate is determined with respect to the number of packets of data in the input stream; means for generating the effective length by selecting either the actual length or a virtual length, wherein the actual length is represented by a byte count, and wherein the virtual length is predetermined and provided by a control circuit; means for selecting the actual length as the effective length when the data rate mode is indicated and for selecting a virtual length as the effective length when the packet rate mode is indicated, wherein, in the packet rate mode, the virtual length is used regardless of the actual length; means for determining which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received; and means for using the effective length to limit a rate of processing the input stream within the apparatus.

7. The apparatus of claim 6, further comprising means for receiving a value, for holding the value, and for providing the value as the virtual length.

8. A network device for managing a flow rate of an input stream of packets based on either a packet rate or a data rate of the input stream, the network device comprising: means for holding an indication of whether the network device is in a packet rate mode or in a data rate mode, wherein the data rate is determined without respect to a number of packets of data in the input stream and wherein the packet rate is determined with respect to the number of packets of data in the input stream; means for generating an effective length by selecting either an actual length or a virtual length, wherein the actual length is represented by a byte count, and wherein the virtual length is predetermined and provided by a control circuit; means for selecting the actual length as the effective length when the data rate mode is indicated and for selecting a virtual length as the effective length when the packet rate mode is indicated, wherein, in the packet rate mode, the virtual length is used regardless of the actual length; means for determining which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received; and means for managing the flow rate of the input stream based on the effective length.

9. The network device of claim 8, further comprising means for receiving a value, for holding the value, and for providing the value as the virtual length.

10. A method of adapting a network device from managing a data rate of an input stream of packets to managing a packet rate of the input stream, the method comprising: holding an indication of whether the network device is in a packet rate mode or in a data rate mode, wherein the data rate is determined without respect to a number of packets of data in the input stream, and wherein the packet rate is determined with respect to the number of packets of data in the input stream; receiving from the network device an actual length for each of the packets; generating an effective length by selecting either the actual length or a virtual length, wherein the actual length is represented by a byte count, and wherein the virtual length is predetermined and provided by a control circuit; selecting, for each packet received, the actual length as an effective length when the data rate mode is indicated and selecting a virtual length as the effective length when the packet rate mode is indicated, wherein, in the packet rate mode, the virtual length is used regardless of the actual length; determining which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received; and providing the effective length to the network device for use in limiting a processing rate of the input stream.

11. The method of claim 10, further comprising receiving a value, storing the value, and providing a value as the virtual length.

12. The method of claim 10, where the managing is selected from one or more of a policing in which excess packets are dropped, a shaping in which excess packets are buffered for possible later transmission, or a stream management process in which some excess packets are dropped and some excess packets are buffered for possible later transmission.

13. A computer-readable storage device including instructions executable by a processor for: holding an indication of whether the network device is in a packet rate mode or in a data rate mode wherein in the data rate mode the data rate is determined without respect to a number of packets of data in the input stream, and wherein in the packet rate mode the data rate is determined with respect to the number of packets of data in the input stream; receiving from the network device an actual length for each of the packets; generating an effective length by selecting either the actual length or a virtual length, wherein the actual length is represented by a byte count, and wherein the virtual length is predetermined and provided by a control circuit; selecting, for each packet received, the actual length as an effective length when the data rate mode is indicated and selecting a virtual length as the effective length when the packet rate mode is indicated, wherein, in the packet rate mode, the virtual length is used regardless of the actual length; providing the effective length to the network device; determining which packets are excess based on a comparison between a virtual time, a current time, and a burst time, wherein a given packet is excess if the virtual time is greater than the current time plus the burst time, wherein the current time is implemented as a free running counter, and wherein the virtual time is predefined and represents a value that the current time must reach before another packet that is not excess is received; and limiting a rate of processing the input stream within the device.

* * * * *